United States Patent
Bilet et al.

(10) Patent No.: US 9,851,109 B2
(45) Date of Patent: Dec. 26, 2017

(54) HEATING DEVICE WITH CONDENSING COUNTER-FLOW HEAT EXCHANGER AND METHOD OF OPERATING THE SAME

(71) Applicant: Elwha LLC, Bellevue, WA (US)

(72) Inventors: Maxime Jean Jerome Bilet, Seattle, WA (US); Roderick A. Hyde, Redmond, WA (US); Muriel Y. Ishikawa, Livermore, CA (US); Jordin T. Kare, San Jose, CA (US); Nathan P. Myhrvold, Bellevue, WA (US); Nels R. Peterson, Bellevue, WA (US); Clarence T. Tegreene, Mercer Island, WA (US); Lowell L. Wood, Jr., Bellevue, WA (US); Victoria Y. H. Wood, Livermore, CA (US); Christopher Charles Young, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 15/008,201

(22) Filed: Jan. 27, 2016

(65) Prior Publication Data

US 2016/0146473 A1 May 26, 2016

Related U.S. Application Data

(63) Continuation of application No. 13/966,670, filed on Aug. 14, 2013, now Pat. No. 9,273,880.

(51) Int. Cl.
*F24C 15/32* (2006.01)
*F24D 5/00* (2006.01)
*F24F 12/00* (2006.01)
*F24C 7/00* (2006.01)
*F24B 1/188* (2006.01)
(Continued)

(52) U.S. Cl.
CPC .......... *F24C 15/322* (2013.01); *F24B 1/1885* (2013.01); *F24C 3/008* (2013.01); *F24C 7/00* (2013.01); *F24C 15/2007* (2013.01); *F24D 5/00* (2013.01); *F24F 12/006* (2013.01); *F24D 2200/22* (2013.01); *Y02B 30/563* (2013.01)

(58) Field of Classification Search
CPC .. F24C 3/00; F24C 7/00; F24C 15/322; F24C 15/2007; F24B 1/1885; F24D 5/00; F24D 2200/22; F24F 12/006; Y02B 30/563
See application file for complete search history.

(56) References Cited

U.S. PATENT DOCUMENTS

821,518 A * 5/1906 Maslin et al. ........ F28D 9/0037
165/166
1,487,709 A 3/1924 Besser
(Continued)

*Primary Examiner* — Ljiljana Ciric
(74) *Attorney, Agent, or Firm* — Foley & Lardner LLP (57) ABSTRACT

A method of operating a heating device includes heating air in a heating device chamber. The method further includes exhausting outgoing air from the heating device chamber via a first flow path through which the outgoing air flows in a first direction, and supplying incoming air to the heating device chamber via a second flow path through which the incoming air flows in a second direction opposite to the first direction. The latent heat in the outgoing air in the first flow path is transferred to the incoming air in the second flow path thereby condensing water vapor contained in the outgoing air to produce liquid water.

32 Claims, 6 Drawing Sheets

(51) Int. Cl.
*F24C 3/00* (2006.01)
*F24C 15/20* (2006.01)

(56) References Cited

U.S. PATENT DOCUMENTS

| | | | |
|---|---|---|---|
| 1,558,848 A | 10/1925 | Doble, Jr. | |
| 1,842,180 A * | 1/1932 | Laird | C10G 7/00 |
| | | | 196/134 |
| 1,845,581 A | 2/1932 | Coakley | |
| 1,953,302 A | 4/1934 | Johnston | |
| 1,958,440 A * | 5/1934 | Miller | C10C 3/04 |
| | | | 203/90 |
| 2,039,429 A | 5/1936 | Lydon | |
| 2,048,644 A | 7/1936 | Winder et al. | |
| 2,075,896 A * | 4/1937 | Harmon | C10G 9/42 |
| | | | 196/128 |
| 2,280,093 A * | 4/1942 | Kleinschmidt | B01D 1/289 |
| | | | 123/41.21 |
| 2,290,465 A * | 7/1942 | Crawford | F24F 3/1417 |
| | | | 165/224 |
| 2,343,542 A | 3/1944 | Faunce | |
| 2,362,940 A | 11/1944 | Skerritt | |
| 2,734,578 A * | 2/1956 | Walter | E21B 36/025 |
| | | | 166/272.1 |
| 2,772,954 A * | 12/1956 | Jequier | C10B 49/08 |
| | | | 122/7 R |
| 2,785,269 A * | 3/1957 | Strader | B05B 7/1686 |
| | | | 219/481 |
| 2,854,915 A * | 10/1958 | Carr | F24F 1/01 |
| | | | 165/217 |
| 3,169,575 A * | 2/1965 | Engalitcheff, Jr. | F28D 5/02 |
| | | | 165/143 |
| 3,231,015 A * | 1/1966 | Koch | F28D 9/0062 |
| | | | 165/134.1 |
| 3,294,160 A * | 12/1966 | Siegfried | F28D 7/00 |
| | | | 165/145 |
| 3,295,605 A * | 1/1967 | Sebald | C02F 1/02 |
| | | | 122/406.1 |
| 3,446,712 A * | 5/1969 | Othmer | C02F 1/16 |
| | | | 159/15 |
| 3,497,312 A * | 2/1970 | Bambenek | B01D 53/34 |
| | | | 128/205.28 |
| 3,556,207 A * | 1/1971 | Piaskowski | F23L 15/04 |
| | | | 165/134.1 |
| 3,583,895 A * | 6/1971 | Othmer | B01D 1/26 |
| | | | 159/16.1 |
| 3,733,777 A * | 5/1973 | Huntington | B01D 53/02 |
| | | | 261/111 |
| 3,739,767 A | 6/1973 | Peters | |
| 3,791,351 A | 2/1974 | Kent | |
| 4,044,950 A | 8/1977 | Engeling et al. | |
| 4,072,182 A * | 2/1978 | Cheng | B01D 1/26 |
| | | | 122/406.4 |
| 4,103,735 A | 8/1978 | Warner | |
| 4,147,303 A | 4/1979 | Talucci | |
| 4,148,356 A * | 4/1979 | Cramer | F02C 3/20 |
| | | | 165/111 |
| 4,169,583 A * | 10/1979 | Cramer | C22B 5/00 |
| | | | 266/114 |
| 4,178,907 A | 12/1979 | Sweat, Jr. | |
| 4,189,848 A * | 2/1980 | Ko | F26B 21/083 |
| | | | 126/635 |
| 4,199,955 A * | 4/1980 | Jonsson | F25B 29/003 |
| | | | 165/133 |
| 4,239,603 A * | 12/1980 | Egosi | B01D 1/2881 |
| | | | 122/40 |
| 4,261,326 A | 4/1981 | Ihlenfield | |
| 4,271,789 A | 6/1981 | Black | |
| 4,275,705 A | 6/1981 | Schaus et al. | |
| 4,280,555 A | 7/1981 | Cieslak | |
| 4,312,320 A | 1/1982 | Jennings | |
| 4,313,399 A | 2/1982 | Black | |
| 4,318,392 A | 3/1982 | Schreiber et al. | |
| 4,344,386 A | 8/1982 | Black | |
| 4,391,227 A | 7/1983 | Forster et al. | |
| 4,403,572 A * | 9/1983 | Gerstmann | F24D 11/002 |
| | | | 122/20 B |
| 4,412,523 A | 11/1983 | Schreiber et al. | |
| 4,426,923 A | 1/1984 | Ohata | |
| 4,429,830 A | 2/1984 | Forster et al. | |
| 4,448,348 A | 5/1984 | Bidwell | |
| 4,449,569 A * | 5/1984 | Lisi | G05D 16/2066 |
| | | | 110/162 |
| 4,502,626 A | 3/1985 | Gerstmann et al. | |
| 4,503,902 A | 3/1985 | Zolik | |
| 4,516,628 A | 5/1985 | Ward | |
| 4,594,856 A * | 6/1986 | Rothmeyer | F25B 17/083 |
| | | | 62/112 |
| 4,629,117 A | 12/1986 | Kasbohm | |
| 4,640,458 A | 2/1987 | Casier et al. | |
| 4,646,541 A * | 3/1987 | Reid, Jr. | C09K 5/047 |
| | | | 62/238.3 |
| 4,648,377 A | 3/1987 | Van Camp | |
| 4,660,511 A * | 4/1987 | Anderson | F01K 23/04 |
| | | | 122/1 C |
| 4,671,212 A | 6/1987 | Smith | |
| 4,722,194 A * | 2/1988 | Kantor | F01K 11/04 |
| | | | 62/101 |
| 4,730,600 A | 3/1988 | Harrigill | |
| 4,785,151 A | 11/1988 | Voegtlin | |
| 4,807,588 A | 2/1989 | Bentley et al. | |
| 4,817,582 A | 4/1989 | Oslin et al. | |
| 4,852,524 A | 8/1989 | Cohen | |
| RE33,082 E | 10/1989 | Gerstmann et al. | |
| 4,896,411 A | 1/1990 | Dempsey | |
| 4,909,307 A | 3/1990 | Besik | |
| 4,928,749 A | 5/1990 | Paull | |
| 4,930,489 A | 6/1990 | McFadden | |
| 4,930,571 A * | 6/1990 | Paull | F24F 12/001 |
| | | | 165/111 |
| 4,974,579 A | 12/1990 | Shellenberger et al. | |
| 5,014,770 A * | 5/1991 | Palmer | F24D 3/005 |
| | | | 126/563 |
| 5,046,478 A | 9/1991 | Clawson | |
| 5,122,352 A | 6/1992 | Johnson | |
| 5,161,739 A * | 11/1992 | Saito | F24D 7/00 |
| | | | 237/67 |
| 5,282,457 A | 2/1994 | Kraemer et al. | |
| 5,351,497 A * | 10/1994 | Lowenstein | B01D 53/263 |
| | | | 62/271 |
| 5,445,216 A | 8/1995 | Cannata | |
| 5,567,215 A | 10/1996 | Bielawski et al. | |
| 5,623,918 A | 4/1997 | Swilik et al. | |
| 5,687,678 A | 11/1997 | Suchomel et al. | |
| 5,696,872 A * | 12/1997 | Seward | F24C 15/322 |
| | | | 219/400 |
| 5,697,435 A | 12/1997 | Stickford et al. | |
| 5,775,126 A * | 7/1998 | Sato | F25B 17/08 |
| | | | 62/480 |
| 5,845,631 A | 12/1998 | Kleva et al. | |
| 5,918,570 A * | 7/1999 | Gilchrist | B01D 19/0047 |
| | | | 122/451 R |
| 6,014,966 A | 1/2000 | Stevenson | |
| 6,044,833 A | 4/2000 | Gebhardt et al. | |
| 6,129,285 A * | 10/2000 | Schafka | B05B 15/1222 |
| | | | 165/226 |
| 6,296,480 B1 | 10/2001 | Anderson et al. | |
| 6,619,951 B2 | 9/2003 | Bodnar et al. | |
| 6,675,880 B2 | 1/2004 | Namba et al. | |
| 6,694,926 B2 | 2/2004 | Baese et al. | |
| 6,986,797 B1 * | 1/2006 | Clawson | B01J 19/0013 |
| | | | 122/4 D |
| 7,066,973 B1 * | 6/2006 | Bentley | B01J 8/0465 |
| | | | 422/198 |
| 7,096,666 B2 | 8/2006 | Fay | |
| 7,114,553 B2 | 10/2006 | Edwards | |
| 7,337,837 B2 | 3/2008 | Edwards | |
| 7,422,009 B2 | 9/2008 | Rummel et al. | |
| 7,487,821 B2 | 2/2009 | Miller et al. | |
| 8,925,541 B2 | 1/2015 | Thompson | |
| 8,978,639 B2 | 3/2015 | Halverson et al. | |

(56) References Cited

U.S. PATENT DOCUMENTS

| | | | |
|---|---|---|---|
| 9,222,678 B2* | 12/2015 | Venkatakrishnan | F24C 11/00 |
| 9,328,916 B2* | 5/2016 | Lampe | F23C 99/006 |
| 9,617,152 B2* | 4/2017 | Johnston | C01B 3/34 |
| 9,631,848 B2* | 4/2017 | Vandermeulen | F25B 29/006 |
| 9,664,404 B2* | 5/2017 | Veltkamp | F24F 12/003 |
| 2002/0038552 A1* | 4/2002 | Maisotsenko | F28D 5/02 62/121 |
| 2002/0164944 A1* | 11/2002 | Haglid | B25B 27/0035 454/228 |
| 2003/0005892 A1 | 1/2003 | Baese et al. | |
| 2003/0070789 A1* | 4/2003 | Mueller | F25D 19/00 165/61 |
| 2003/0070799 A1* | 4/2003 | Mueller | A47J 39/006 165/254 |
| 2003/0167768 A1* | 9/2003 | Clawson | C01B 3/384 60/670 |
| 2004/0103637 A1* | 6/2004 | Maisotsenko | F01K 21/047 60/39.59 |
| 2004/0123615 A1* | 7/2004 | Yabu | B01D 53/261 62/271 |
| 2004/0219079 A1* | 11/2004 | Hagen | F01K 21/047 422/607 |
| 2005/0056313 A1* | 3/2005 | Hagen | B01F 5/0453 137/3 |
| 2005/0236136 A1* | 10/2005 | Veltkamp | F24F 12/001 165/4 |
| 2005/0274328 A1 | 12/2005 | Baese et al. | |
| 2006/0093713 A1* | 5/2006 | Jurkovich | A23K 40/00 426/511 |
| 2006/0093718 A1* | 5/2006 | Jurkovich | A23K 40/00 426/524 |
| 2006/0225726 A1* | 10/2006 | Andoh | F24C 15/2007 126/20 |
| 2006/0248799 A1* | 11/2006 | Bandhauer | H01M 8/04014 48/189.2 |
| 2006/0251940 A1* | 11/2006 | Bandhauer | H01M 8/04014 429/414 |
| 2007/0234702 A1* | 10/2007 | Hagen | B60H 1/032 60/39.01 |
| 2008/0003940 A1* | 1/2008 | Haglid | F24F 3/14 454/228 |
| 2008/0022547 A1* | 1/2008 | Shivvers | F26B 3/205 34/333 |
| 2008/0184587 A1* | 8/2008 | Shivvers | F26B 3/08 34/491 |
| 2008/0184589 A1* | 8/2008 | Shivvers | F26B 3/08 34/504 |
| 2008/0209755 A1* | 9/2008 | Shivvers | F26B 11/04 34/363 |
| 2008/0209759 A1* | 9/2008 | Shivvers | F26B 11/04 34/514 |
| 2008/0244975 A1* | 10/2008 | Johnston | B01J 19/249 48/197 FM |
| 2008/0264062 A1* | 10/2008 | Prueitt | F01K 27/00 60/670 |
| 2009/0188447 A1 | 7/2009 | Lutz | |
| 2009/0264060 A1* | 10/2009 | Livchak | B08B 15/023 454/61 |
| 2010/0107439 A1* | 5/2010 | Shivvers | F26B 17/122 34/477 |
| 2010/0176064 A1* | 7/2010 | Batty | B01D 1/0058 210/737 |
| 2010/0314238 A1* | 12/2010 | Frolov | B01D 1/0047 203/10 |
| 2011/0108406 A1* | 5/2011 | Maisotsenko | B01D 1/22 203/11 |
| 2011/0232124 A1* | 9/2011 | Shivvers | F26B 3/205 34/428 |
| 2012/0080023 A1 | 4/2012 | Thompson | |
| 2012/0180505 A1* | 7/2012 | Gerber | F24D 5/12 62/82 |
| 2012/0240551 A1* | 9/2012 | Johnson | F02C 6/18 60/266 |
| 2013/0074694 A1* | 3/2013 | Govindan | B01D 5/0027 95/150 |
| 2013/0101492 A1* | 4/2013 | McAlister | C01B 31/02 423/418.2 |
| 2013/0153399 A1* | 6/2013 | McAlister | B01J 19/0053 203/25 |
| 2013/0199921 A1* | 8/2013 | McGovern | B01D 1/16 203/10 |
| 2013/0232983 A1* | 9/2013 | Maslov | F02C 3/20 60/772 |
| 2013/0233213 A1* | 9/2013 | Martin | F23N 1/022 110/348 |
| 2013/0233288 A1* | 9/2013 | Schnepel | F02G 3/02 123/528 |
| 2013/0236840 A1* | 9/2013 | Maslov | F23G 5/46 431/11 |
| 2013/0236841 A1* | 9/2013 | Armstrong | F23C 9/00 431/12 |
| 2013/0299123 A1* | 11/2013 | Matula | F24D 11/0221 165/45 |
| 2013/0333684 A1* | 12/2013 | Cescot | F24C 15/2007 126/21 A |
| 2014/0245769 A1* | 9/2014 | Vandermeulen | F25B 29/006 62/238.3 |
| 2015/0000275 A1* | 1/2015 | Prueitt | F03G 7/05 60/641.7 |
| 2015/0308711 A1* | 10/2015 | Gillan | F24H 8/003 122/14.3 |
| 2017/0016645 A1* | 1/2017 | Maisotsenko | 2/6 |

* cited by examiner

HEATING DEVICE WITH CONDENSING COUNTER-FLOW HEAT EXCHANGER AND METHOD OF OPERATING THE SAME

CROSS-REFERENCE TO RELATED PATENT APPLICATIONS

This application is a continuation of application Ser. No. 13/966,670, filed Aug. 14, 2013, which is incorporated herein by reference in its entirety.

BACKGROUND

Heating devices can be used to cook food or perform various industrial processes (e.g., drying, baking, setting paint, etc.). Heating devices can be relatively small for residential uses or relatively large for commercial or industrial uses.

SUMMARY

One exemplary embodiment relates to a heating device including a heating device chamber, a heating element for heating air in the heating device chamber, and a condensing counter-flow heat exchanger including a first flow path that receives outgoing air from the heating device chamber and a second flow path for providing incoming air to the heating device chamber. The first flow path and the second flow path are configured in a counter-flow heat exchange relationship such that the outgoing air flows in a direction opposite the incoming air and the latent heat of evaporated water in the outgoing air is transferred to the incoming air thereby condensing liquid water from the outgoing air.

Another exemplary embodiment relates to a method of operating a heating device including heating air in a heating device chamber, exhausting outgoing air from the heating device chamber via a first flow path through which the outgoing air flows in a first direction, supplying incoming air to the heating device chamber via a second flow path through which the incoming air flows in a second direction opposite to the first direction, and transferring the latent heat of evaporated water in the outgoing air in the first flow path to the incoming air in the second flow path thereby condensing liquid water from the outgoing air.

Another exemplary embodiment relates to a heating device including a heating device chamber, a heating element for heating air in the heating device chamber, and a condensing counter-flow heat exchanger in which latent heat from outgoing air exiting the heating device chamber is transferred to incoming air entering the heating device chamber so that liquid water condenses from the outgoing air.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

As food cooks in a heating device, water evaporates from the food. Much of the energy supplied to food in a heating device does not raise the temperature of the food, but rather provides the energy necessary to evaporate water from the food as the food cooks. The energy efficiency of a heating device can be improved by recovering the latent heat of the evaporated water in a condensing heat exchanger and using the recovered energy to heat incoming air prior to the incoming air entering the heating device chamber.

Figure 1A:
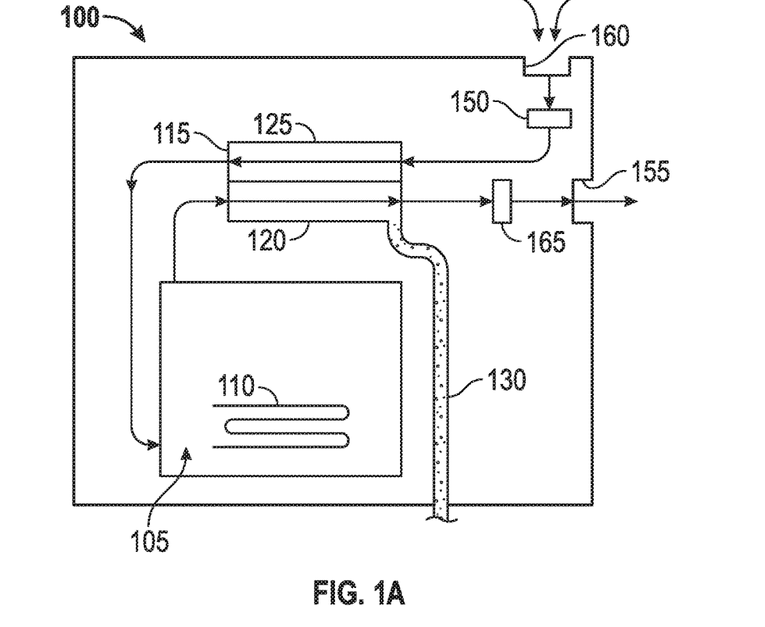
FIGS. 1A-1C are schematic diagrams of a heating device according to various exemplary embodiments.
Figure 1B:
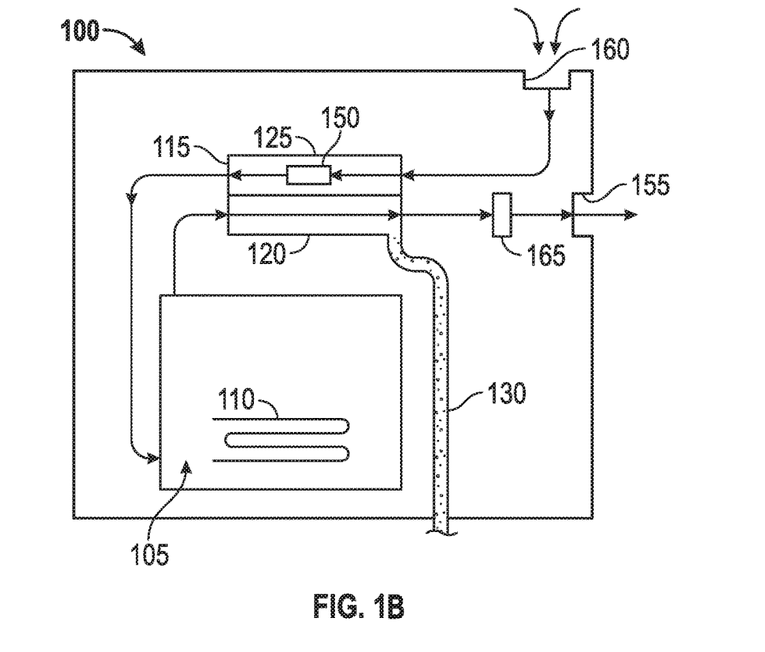
Figure 1C:
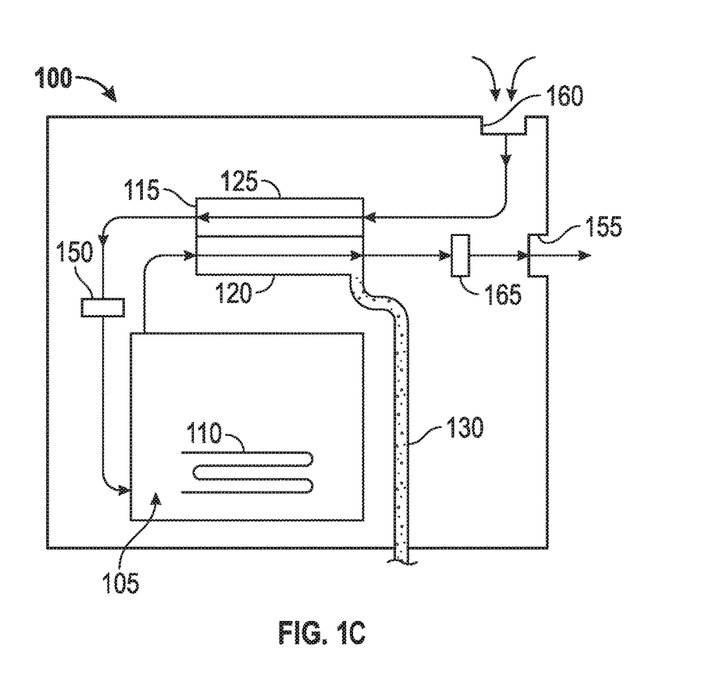

Referring to FIGS. 1A-1C, a heating device 100 according to an exemplary embodiment is illustrated. Heating device 100 (e.g., an oven) includes heating device chamber 105, heating element 110, and condensing counter-flow heat exchanger 115. Heating element 110 can be an electrical heating element, a gas heating element, or other appropriate heating element for heating the air in the heating device chamber 105. One or more racks or other structures for supporting food or cookware may be positioned in heating device chamber 105. In some embodiments, heating chamber 105 is heated to temperatures above 60° C. (140° F.) (e.g., above 100° C. (212° F.). In some embodiments, heating device chamber 105 is not sized for human occupation.

Figure 2:
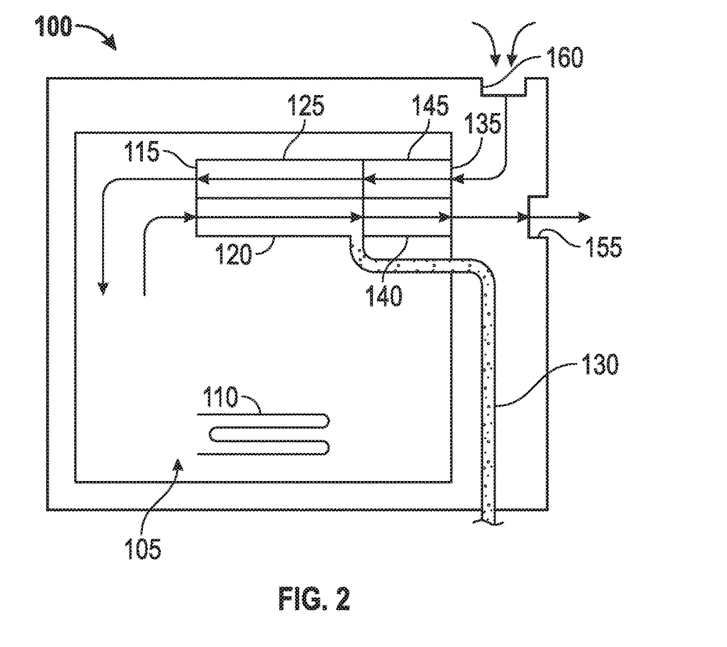
FIG. 2 is a schematic diagram of a heating device according to an exemplary embodiment.

Condensing counter-flow heat exchanger 115 is an air-to-air heat exchanger and includes first or outgoing air flow path 120 and second or incoming air flow path 125. Outgoing air from the heating device chamber 105 passes through first flow path 120 and incoming air passes through second air flow path 125 before entering heating device chamber 105. The outgoing air is relatively hot and contains evaporated water. The incoming air is relatively cool (i.e., cooler than outgoing air). First flow path 120 and second flow path 125 are positioned in a counter-flow arrangement so that the direction of flow of the outgoing air is opposite the direction of flow of the incoming air. First flow path 120 and second flow path 125 are also arranged in a condensing heat exchange relationship so that the latent heat of the evaporated water in the outgoing air is transferred to the incoming air thereby condensing liquid water from the outgoing air. In this way, the outgoing air is dried and cooled as it passes through first flow path 120 and the incoming air is heated as it passes through second flow path 125 so that it reaches heating device chamber 105 already above the ambient temperature outside heating device 100. In some embodiments, first flow path 120 and/or second flow path 125 can be formed with microchannels to improve heat transfer therebetween. The use of microchannels results in laminar flow through the flow path. In some embodiments, fins, heat pipes, heat-transfer-fluid loops, or other means for local heat transfer between first flow path 120 and second flow path 125 extend into first flow path 120 and/or second flow path 125 to improve heat transfer therebetween. In some embodiments, the outgoing air in first flow path 120 and/or the incoming air in the second flow path 125 is fully enclosed (e.g., in a tube or conduit). In other embodiments, the outgoing air in first flow path 120 and/or the incoming air in the second flow path 125 is partially enclosed (e.g., in a channel having at least one open side). In other embodiments, the air flows through the condensing counter-flow heat exchanger 115 are separated by a heat exchange surface (i.e., not enclosed). Drain 130 collects the condensed water from first flow path 120 and discharges the condensed water from heating device 100. In some embodiments, drain 130 is positioned at or near the outlet of first flow path 120. In some embodiments, as shown in FIGS. 1A-1C, condensing counter-flow heat exchanger 115 is positioned outside of heating device chamber 105. In other embodiments, as shown in FIG. 2, condensing counter-flow heat exchanger 115 is positioned within heating device chamber 105. In other embodiments, at least one of first flow path 120 and second flow path 125 is positioned within heating device chamber 105. In other embodiments, at least a portion of condensing counter-flow heat exchanger 115 is positioned within heating device chamber 105. For example, space considerations may require a portion of condensing counter-flow heat exchanger 115 to be positioned within heating device chamber 105. Any such portions including the second flow path 125 or other component that needs to remain relatively cool would be insulated from heating device chamber 105.

As illustrated in FIG. 2, in some embodiments, further heat exchange of heat of the outgoing air to the incoming air takes place in a pre-heat heat exchanger 135. Pre-heat exchanger 135 includes third or outgoing flow path 140 and fourth or incoming flow path 145. Third flow path 140 receives the at least partially dried and cooled outgoing air from first flow path 120 and incoming air flows through fourth flow path 145 prior to entering second flow path 125. Third flow path 140 and fourth flow path 145 are arranged in a heat exchange relationship so that heat (e.g., sensible heat and/or latent heat) from the outgoing air in third flow path 140 is transferred to the incoming air in fourth flow path 145. The outgoing air exiting first flow path 120 may not be fully dried, so latent heat may be transferred from the outgoing air in third flow path 140 to the incoming air in fourth flow path 145 and water is condensed from the outgoing air in third flow path 140. Once the outgoing air is fully dried, sensible heat may also be transferred from the outgoing air in third flow path 140 to the incoming air in fourth flow path 145. In this way, the outgoing air is further cooled and/or dried and the incoming air is preheated before it enters second flow path 125. Third flow path 140 and fourth flow path 145 are arranged to create a counter-flow, cross-flow, or other appropriate heat exchange relationship between the outgoing air and the incoming air.

Referring to FIGS. 1A-1C, in some embodiments, heating device 100 also includes pre-heating heating element 150. Pre-heating element 150 is used to pre-heat the incoming air prior to the incoming air entering the heating device chamber 105. Accordingly, the pre-heating element 150 can be located prior to or upstream of second flow path 125 (see FIG. 1A), within the second flow path 125 (see FIG. 1B), or after or downstream from second flow path 125 (see FIG. 1C). In some embodiments, multiple pre-heating elements 150 are found in more than one location. In other embodiments, as shown in FIG. 2, no pre-heating element 150 is included in heating device 100. Pre-heating heating element 150 can be an electrical heating element, a gas heating element, or other appropriate heating element. In some embodiments, pre-heating element 150 directly heats the incoming air (e.g., the incoming air passes over pre-heating element 150). In other embodiments, pre-heating element 150 indirectly heats the incoming air via a heat exchanger. For example, pre-heating element 150 may heat a heat-exchange medium (e.g., air or other fluid), which is placed in a heat exchange relationship with the incoming air so that heat from the heat-exchange medium is transferred to the incoming air.

Referring to FIGS. 1A-1C, in some embodiments, heating device 100 has an open air flow and includes exhaust outlet 155 and air inlet 160. Exhaust outlet 155 is located after or downstream of first flow path 120 for exhausting the outgoing air from heating device 100. Exhaust filter 165 filters the outgoing air (e.g., to remove food particles, volatiles, grease, etc.). Exhaust filter 165 is located at or upstream of exhaust outlet 155. Air inlet 160 is located before or upstream of second flow path 125 and allows ambient air located outside of heating device 100 to enter heating device 100 and pass through second flow path 125 as the incoming air.

Figure 3:
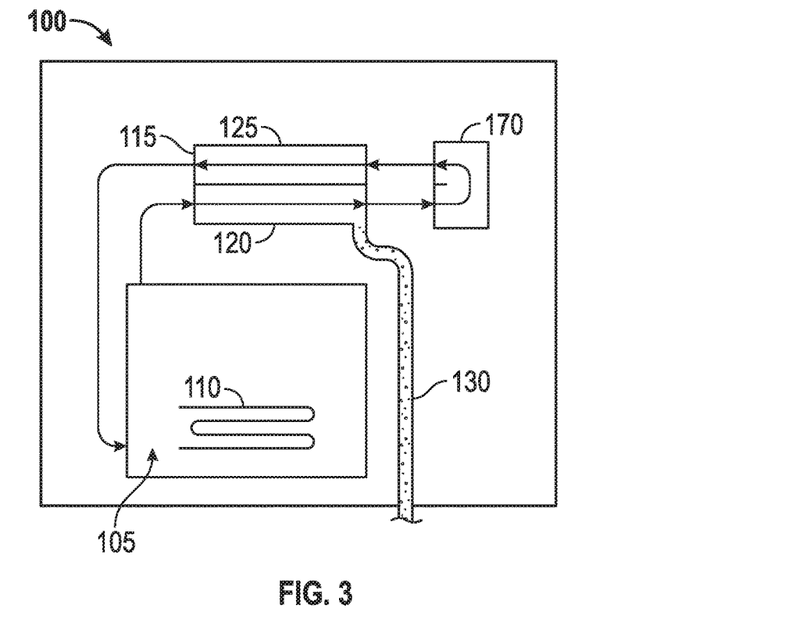
FIG. 3 is a schematic diagram of a heating device according to an exemplary embodiment.

Referring to FIG. 3, in some embodiments, heating device 100 has a closed air flow and includes recirculation flow path 170 connecting the exit of first flow path 120 to the entrance of second flow path 125 such that the outgoing air exits first flow path 120, passes through the recirculation flow path 170, and enters second flow path 125 as the incoming air.

Figure 4:
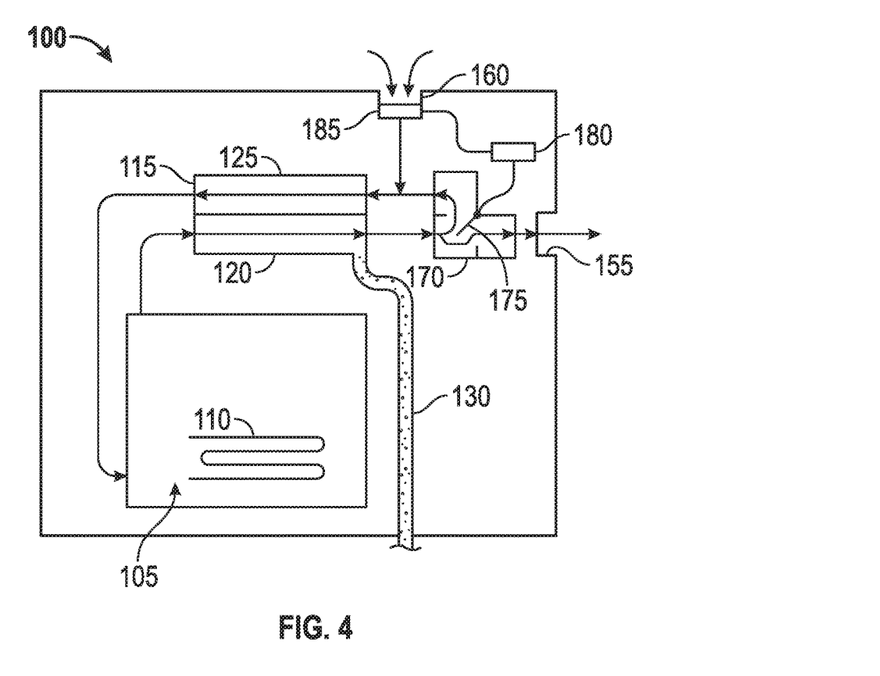
FIG. 4 is a schematic diagram of a heating device according to an exemplary embodiment.

Referring to FIG. 4, in some embodiments, heating device 100 has a controllable air flow and includes recirculation flow path 170 and outgoing air damper 175. Outgoing air damper 175 controls the amount of the outgoing air exiting first flow path 120 that is exhausted from heating device 100 through exhaust outlet 155 and the amount of outgoing air exiting first flow path 120 that passes through recirculation flow path 170, and enters second flow path 125 as at least a portion of the incoming air. Outgoing air damper 175 is movable among multiple positions from an exhaust position in which all of the outgoing air exiting first flow path 120 is directed to exhaust outlet 155 and a recirculation position in which all of the outgoing air exiting first flow path 120 is directed to recirculation flow path 170. The position of outgoing air damper 175 can be set by the user, preset when heating device 100 is manufactured, and/or automatically controlled by control unit or processing circuit 180. Control unit 180 can automatically control the position of outgoing air damper 175 to control an exit state (e.g., temperature and/or humidity) of the outgoing air exiting first flow path 120. For example, control unit 180 could control the position of outgoing air damper 175 to ensure that the temperature of the outgoing air exiting exhaust outlet 155 does not exceed a predetermined temperature. Such a predetermined temperature may be selectively set by the user or preset when heating device 100 is manufactured.

Control unit 180 can also be configured to control other functions of heating device 100. In an exemplary embodiment, control unit 180 includes a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory.

Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

Referring to FIG. 4, in some embodiments, heating device 100 also includes incoming air damper 185. Incoming air damper 185 controls the amount of ambient air located outside of heating device 100 that is allowed to enter heating device 100 through air inlet 160 and then be provided to second flow path 125 as the incoming air. Incoming air damper 185 is movable among multiple positions including an open position in which the maximum amount of ambient air is allowed to pass through the damper and a closed position in which no air is allowed pass the damper so that none of the incoming air entering the second flow path 125 is ambient air. With incoming air damper 185 in the closed position and outgoing air damper 175 in the recirculation position, heating device 100 as shown in FIG. 4 functions as a closed air flow heating device as shown in FIG. 3. With incoming air damper 185 in the open position and outgoing air damper 175 in the exhaust position, heating device 100 as shown in FIG. 4 functions as an open air flow heating device as shown in FIGS. 1A-1C. The position of incoming air damper 185 can be set by the user, preset when heating device 100 is manufactured, and/or automatically controlled by control unit or processing circuit 180. Control unit 180 can automatically control the position of outgoing air damper 175 and/or the position of incoming air damper 185 to control the amount of heat transferred to the incoming air in condensing counter-flow heat exchanger 115, the temperature of the air in heating device chamber 105, and/or the humidity of the air in heating device chamber 105. In some embodiments, the position of one or both of outgoing air damper 175 and incoming air damper 185 are fixed.

The flow of the outgoing air through the condensing counter-flow heat exchanger 115 can be controlled in other ways (e.g., varied in flow rate and/or volume) in order to control a state (e.g., temperature or humidity) of the outgoing air exiting first flow path 120, to control a state (e.g. temperature or humidity) of the air in heating device chamber 105, and/or to control the amount of heat transferred to the incoming air flowing through the second flow path 125.

Figure 5:
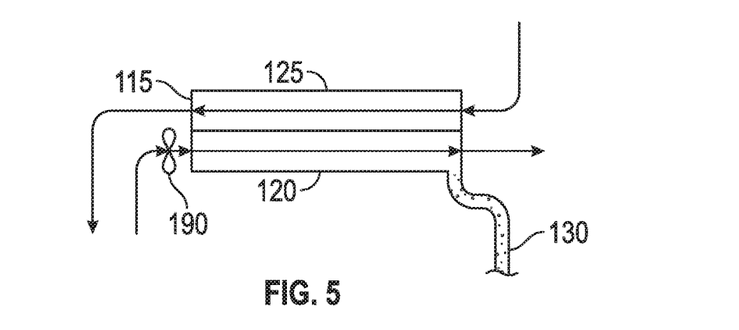
FIG. 5 is a schematic diagram of a portion of a heating device according to an exemplary embodiment.

For example, as shown in FIG. 5, blower 190 can be used to vary the flow rate of the outgoing air flowing through first flow path 120 by varying the speed of blower 190. Blower 190 can be located before or upstream of first flow path 120, within first flow path 120, or after or downstream of first flow path 120. Control unit 180 is configured to control the speed of blower 190.

Figure 6:
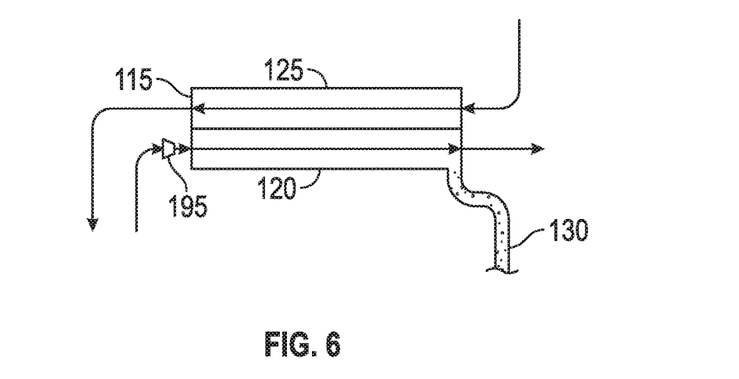
FIG. 6 is a schematic diagram of a portion of a heating device according to an exemplary embodiment.

As another example, as shown in FIG. 6, throttle 195 can be used to vary the flow rate of the outgoing air flowing through first flow path 120. Throttle 195 creates a flow restriction of variable size, wherein changing the size of the restriction changes the flow rate of the outgoing air flowing through first flow path 120. Throttle 195 can be located before or upstream of first flow path 120, within first flow path 120, or after or downstream of first flow path 120. Control unit 180 is configured to control throttle 195.

Figure 7:
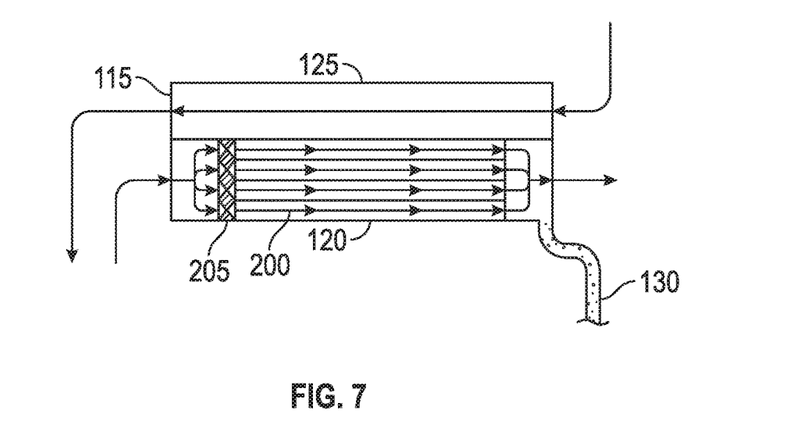
FIG. 7 is a schematic diagram of a portion of a heating device according to an exemplary embodiment.

As another example, as shown in FIG. 7, first flow path 120 is divided into multiple passageways 200, with each passageway 200 controlled by a valve 205. By selectively opening, closing, or throttling each valve 205, the amount or volume of outgoing air flowing through first flow path 120 can be controlled. Control unit 180 is configured to control valves 205.

Figure 8:
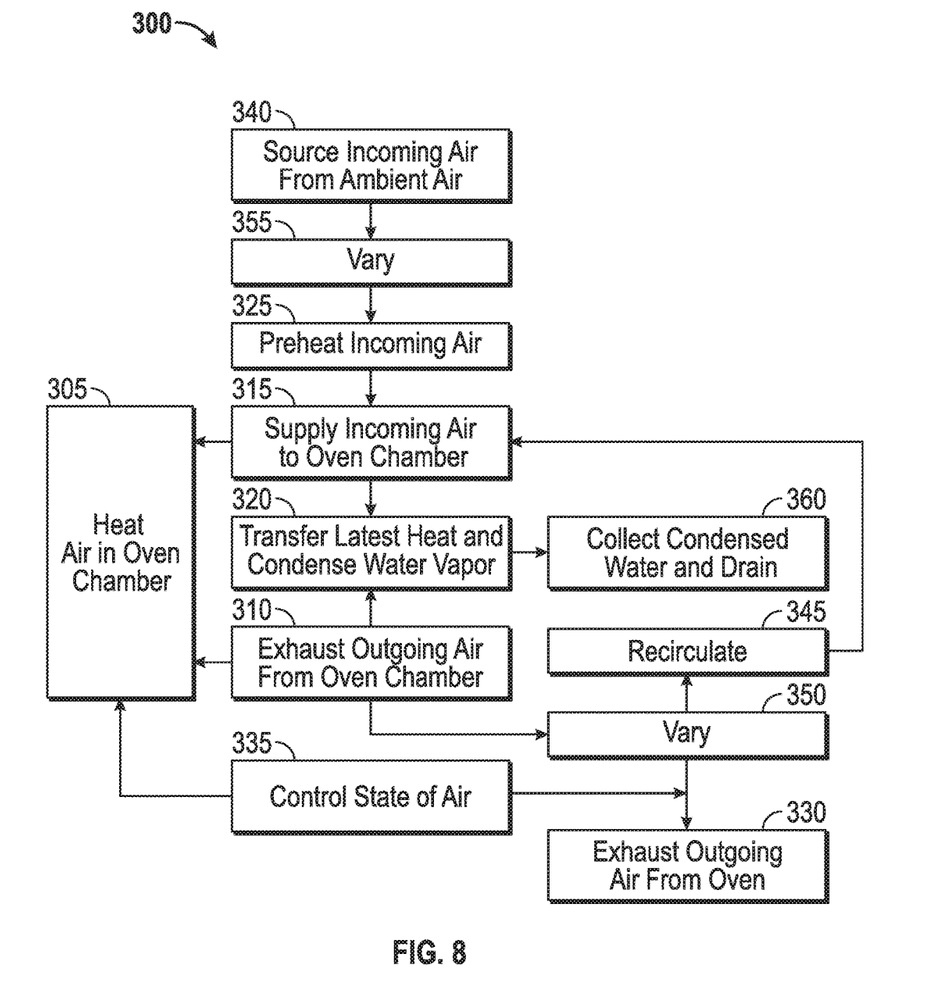
FIG. 8 is a flowchart of a method of operating a heating device according to an exemplary embodiment.

Referring to FIG. 8, a method of operating a heating device is illustrated according an exemplary embodiment. For purposes of explanation, method 300 will be described with reference to the various embodiments of heating device 100 described above. However, this is not intended to limit method 300 solely to implementation by heating device 100. In method 300, air is heated in a heating device chamber (step 305). Outgoing air is exhaust from the heating device chamber via a first flow path (step 310). Incoming air is supplied to the heating device chamber via a second flow path (step 315). Latent heat from evaporated water in the outgoing air in the first flow path is transferred to the incoming air in the second flow path, thereby condensing liquid water from the outgoing air (step 320). The outgoing air flows in a first direction in the first flow path and the incoming air flows in a second opposite direction in the second flow path. In some embodiments, the incoming air is pre-heated before the incoming air enters the heating device chamber (e.g., by one or more of the pre-heating elements or heat exchangers described above) (step 325). In some embodiments, the outgoing air is exhausted from the heating device (step 330). In some embodiments, an exit state (e.g. temperature or humidity) of the outgoing air exhausted from the heating device, the amount of heat transferred to the incoming air, and/or a state (e.g., temperature or humidity) of the air in the heating device chamber is controlled (e.g., by one or more of the appropriate devices described above) (step 335). In some embodiments, ambient air is used as a source for at least a portion of the incoming air (step 340). In some embodiments, the first flow path and the second flow path are fluidly connected by a recirculation flow path so that at least a portion of the outgoing air from the second flow path is recirculated to the first flow path via the recirculation flow path for use as at least a portion of the incoming air (step 345). In some embodiments, another portion of the outgoing air from the second flow path is exhausted from the heating device (step 330). In some embodiments, the amount of outgoing air recirculated and the amount of outgoing air exhausted are varied (e.g., by outgoing air damper 175 described above) (step 350). In some embodiments, the amount of incoming air sourced from ambient are is varied (e.g. by incoming air damper 185 described above (step 355). In some embodiments, the condensed water is collected from the first flow path and discharged from the heating device (step 360).

Figure 9:
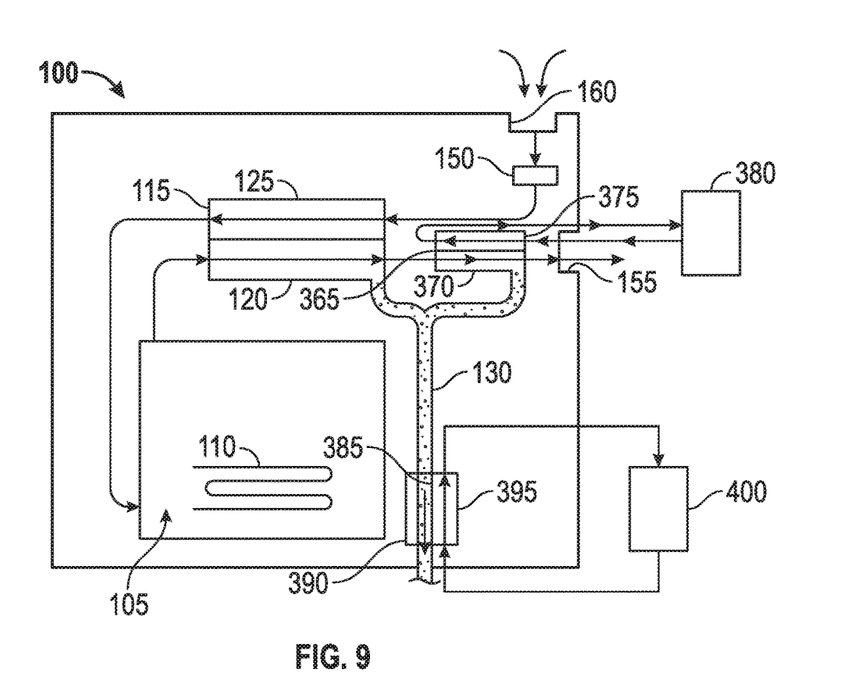
FIG. 9 is a schematic diagram of a heating device according to an exemplary embodiment.

As illustrated in FIG. 9, in some embodiments, further heat exchange of heat of the outgoing air to the incoming air takes place in a secondary heat exchanger 365. Secondary heat exchanger 365 includes fifth or outgoing flow path 370 and sixth or incoming flow path 375. Outgoing flow path 370 receives the at least partially dried and cooled outgoing air from first flow path 120 and incoming heat exchange medium (e.g. air, water, or other fluid) flows through incoming flow path 375 from a useful heat sink 380 external to the heating device 100. Useful heat sink 380 may be one or more water heaters and/or living space heaters (e.g. radiant heaters, radiator, etc.). Outgoing flow path 370 and incoming flow path 375 are arranged in a heat exchange relationship so that heat (e.g., sensible heat and/or latent heat) from the outgoing air in outgoing flow path 370 is transferred to the incoming heat exchange medium in incoming flow path 375. The outgoing air exiting first flow path 120 may not be fully dried, so latent heat may be transferred from the outgoing air in outgoing flow path 370 to the incoming heat exchange fluid in incoming flow path 375 and water is condensed from the outgoing air in outgoing flow path 370. Once the outgoing air is fully dried, sensible heat may also be transferred from the outgoing air in outgoing flow path 370 to the incoming heat exchange fluid in incoming flow path 375. In this way, the outgoing air is further cooled and/or dried and the incoming heat exchange fluid is heated for use by useful heat sink 380. The heated heat exchange fluid is returned to useful heat sink 380. Useful heat sink 380 may directly make use of the heated heat exchange fluid (e.g., exhausting heated air to a room to be heated, storing heated water in water heater tank, etc.) or indirectly make use of the heated heat exchange fluid (e.g., heated air as the input to another heat exchanger for heating water in a water heater, heated water as the heat input for a radiant heater, etc.). Outgoing flow path 370 and incoming flow path 375 are arranged to create a counter-flow, cross-flow, or other appropriate heat exchange relationship between the outgoing air and the incoming heat exchange fluid. Secondary heat exchanger 365 increases the efficiency of heating device 100 by making use of the heat in the outgoing air that is left over after transferring heat to the incoming air in second flow path 125. Secondary heat exchanger 365 puts this leftover heat in the outgoing air to use in useful heat sink 380.

As illustrated in FIG. 9, in some embodiments, heat exchange of the heat of the condensed water collected in drain 130 takes place in a condensate heat exchanger 385. Condensate heat exchanger 385 includes seventh or outgoing flow path 390 and eighth or incoming flow path 395. Condensed water from the drain 130 (which is relatively warm, e.g., up to 100° C. (212° F.)) flows through outgoing flow path 390 and incoming heat exchange medium (e.g. air, water, or other fluid) flows through incoming flow path 395 from a useful heat sink 400 external to the heating device 100. Useful heat sink 400 may be one or more water heaters and/or living space heaters (e.g. radiant heaters, radiator, etc.). Outgoing flow path 390 and incoming flow path 395 are arranged in a heat exchange relationship so that heat from the condensed water in outgoing flow path 390 is transferred to the incoming heat exchange medium in incoming flow path 395. In this way, the condensed water is cooled and the incoming heat exchange fluid is heated for use by useful heat sink 400. The heated heat exchange fluid is returned to useful heat sink 400. Useful heat sink 400 may directly make use of the heated heat exchange fluid (e.g., exhausting heated air to a room to be heated, storing heated water in water heater tank, etc.) or indirectly make use of the heated heat exchange fluid (e.g., heated air as the input to another heat exchanger for heating water in a water heater, heated water as the heat input for a radiant heater, etc.). Outgoing flow path 390 and incoming flow path 395 are arranged to create a counter-flow, cross-flow, or other appropriate heat exchange relationship between the outgoing air and the incoming heat exchange fluid. Condensate heat exchanger 385 increases the efficiency of heating device 100 by making use of heat in the condensed water. Condensate heat exchanger 385 puts this heat in the condensed water to use in useful heat sink 380. Alternatively, the condensate heat exchanger 385 is omitted and the hot condensed water collected in drain 130 may be routed directly to useful heat sink 400 for use (e.g., storing hot condensed water in a water heater for later use, using hot condensed water as the heat input for a radiant heater). In some embodiments including both secondary heat exchanger 365 and condensate heat exchanger 385, the heated heat exchange fluid from incoming flow paths 375 and 395 is routed to a single useful heat sink. In some embodiments including both secondary heat exchanger 365 and condensate heat exchanger 385, condensed water from secondary heat exchanger 365 is also collected in drain 130 and routed through condensate heat exchanger 385.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of operating a heating device, comprising:
heating air in a heating device chamber;
exhausting outgoing air from the heating device chamber via a first flow path through which the outgoing air flows in a first direction;
supplying incoming air to the heating device chamber via a second flow path through which the incoming air flows in a second direction opposite to the first direction;
transferring the latent heat in the outgoing air in the first flow path to the incoming air in the second flow path by cooling the outgoing air as the outgoing air passes through the first flow path and through a condensing counterflow heat exchanger, thereby condensing water vapor contained in the outgoing air to produce liquid water; and
pre-heating the incoming air, additionally to transferring the latent heat, using a separte pre-heating element before the incoming air enters the heating device chamber.

2. The method of claim 1, wherein pre-heating the incoming air includes pre-heating the incoming air upstream of the second flow path.

3. The method of claim 1, wherein pre-heating the incoming air includes pre-heating the incoming air downstream of the second flow path.

4. The method of claim 1, wherein pre-heating the incoming air includes pre-heating the incoming air in the second flow path.

5. The method of claim 1, further comprising:
controlling the flow of outgoing air to control the amount of heat transferred to the incoming air.

6. The method of claim 1, further comprising:
controlling the flow of outgoing air to control the temperature of the air in the heating device chamber.

7. The method of claim 1, further comprising:
controlling the flow of outgoing air to control the humidity of the air in the heating device chamber.

8. The method of claim 1, further comprising:
fluidly connecting the first flow path to the second flow path via a recirculation flow path.

9. The method of claim 8, further comprising:
recirculating at least a first portion of the outgoing air from the second flow path to the first flow path via the recirculation flow path for use as at least a portion of the incoming air.

10. The method of claim 9, further comprising:
exhausting at least a second portion of the outgoing air from the heating device.

11. The method of claim 9, further comprising:
varying the first portion of the outgoing air and the second portion of the outgoing air.

12. The method of claim 11, further comprising:
varying the first portion of the outgoing air and the second portion of the outgoing air to control an exit state of the second portion of the outgoing air.

13. A method, comprising:
heating air in a heating chamber;
transferring latent heat from outgoing air exiting the heating chamber to incoming air entering the heating chamber by drying and cooling the outgoing air using a condensing counter-flow heat exchanger so that liquid water condenses from water vapor contained in the outgoing air; and
pre-heating the incoming air using a pre-heating element before the incoming air enters the heating device chamber.

14. The method of claim 13, wherein pre-heating the incoming air includes pre-heating the incoming air upstream of the second flow path.

15. The method of claim 13, wherein pre-heating the incoming air includes pre-heating the incoming air downstream of the second flow path.

16. The method of claim 13, wherein pre-heating the incoming air includes pre-heating the incoming air in the second flow path.

17. The method of claim 13, further comprising:
controlling the flow of outgoing air to control the amount of heat transferred to the incoming air.

18. The method of claim 13, further comprising:
controlling the flow of outgoing air to control the temperature of the air in the heating device chamber.

19. The method of claim 13, further comprising:
controlling the flow of outgoing air to control the humidity of the air in the heating device chamber.

20. The method of claim 13, further comprising:
fluidly connecting the first flow path to the second flow path via a recirculation flow path.

21. The method of claim 20, further comprising:
recirculating at least a first portion of the outgoing air from the second flow path to the first flow path via the recirculation flow path for use as at least a portion of the incoming air.

22. The method of claim 21, further comprising:
exhausting at least a second portion of the outgoing air from the heating device.

23. The method of claim 21, further comprising:
varying the first portion of the outgoing air and the second portion of the outgoing air.

24. The method of claim 23, further comprising:
varying the first portion of the outgoing air and the second portion of the outgoing air to control an exit state of the second portion of the outgoing air.

25. A method of operating a heating device, comprising:
exhausting outgoing air from a heating device chamber via a first flow path through which the outgoing air flows;
supplying incoming air to the heating device chamber via a second flow path through which the incoming air flows;
transferring the latent heat in the outgoing air in the first flow path to the incoming air in the second flow path by cooling the outgoing air as it passes through the first flow path and through a condensing counterflow heat exchanger, thereby condensing water vapor contained in the outgoing air to obtain liquid water from the outgoing air; and
pre-heating the incoming air, additionally to transferring the latent heat, using a separate pre-heating element before the incoming air enters the heating device chamber.

26. The method of claim 25, wherein pre-heating the incoming air includes pre-heating the incoming air upstream of the second flow path.

27. The method of claim 25, wherein pre-heating the incoming air includes pre-heating the incoming air downstream of the second flow path.

28. The method of claim 25, wherein pre-heating the incoming air includes pre-heating the incoming air in the second flow path.

29. The method of claim 25, further comprising:
controlling the flow of outgoing air to control the amount of heat transferred to the incoming air.

30. The method of claim 25, further comprising:
controlling the flow of outgoing air to control the temperature of the air in the heating device chamber.

31. The method of claim 25, further comprising:
controlling the flow of outgoing air to control the humidity of the air in the heating device chamber.

32. The method of claim 25, further comprising:
fluidly connecting the first flow path to the second flow path via a recirculation flow path.

* * * * *